Patented Aug. 26, 1952

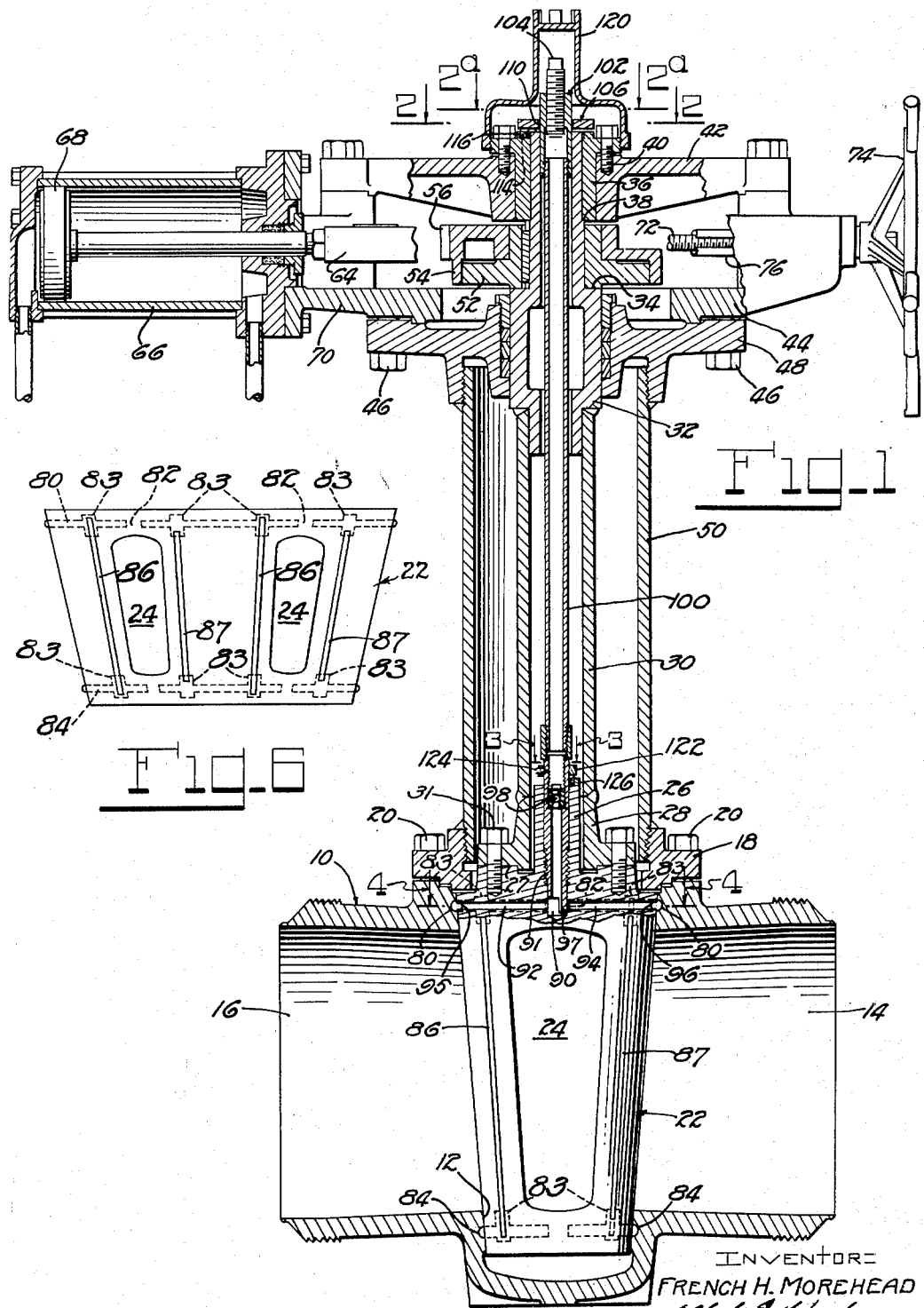

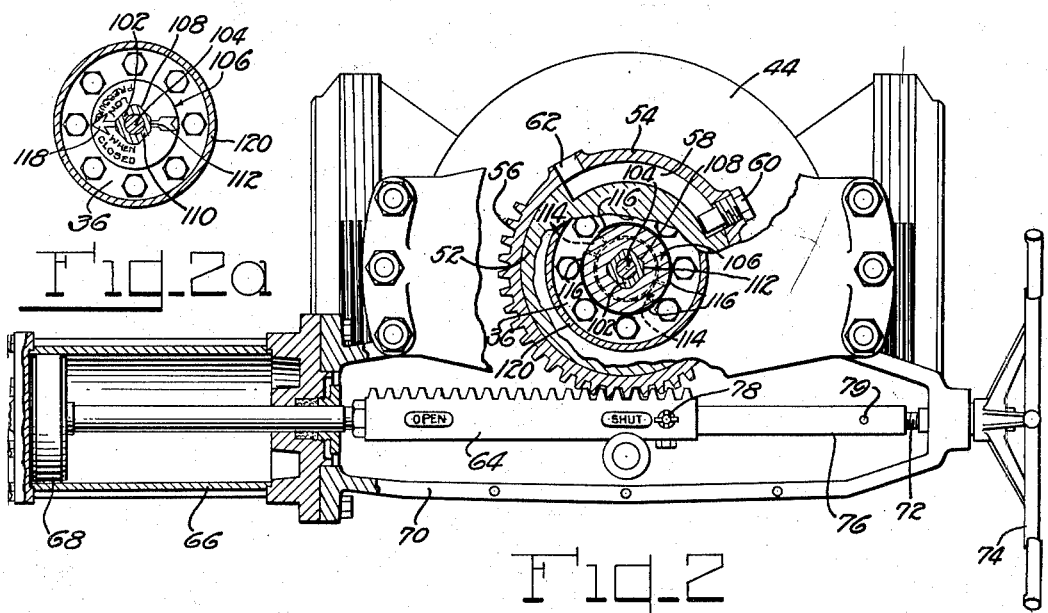
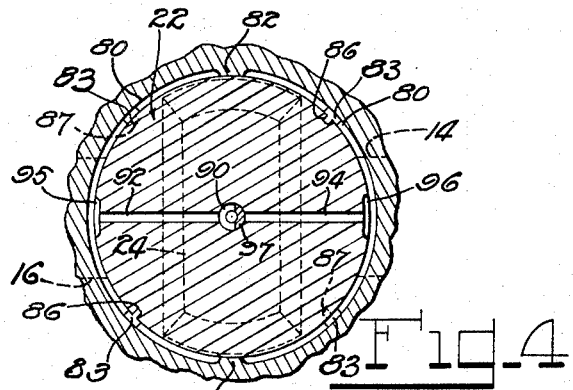
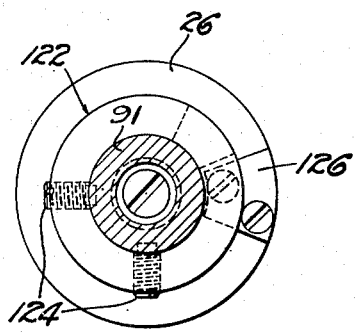
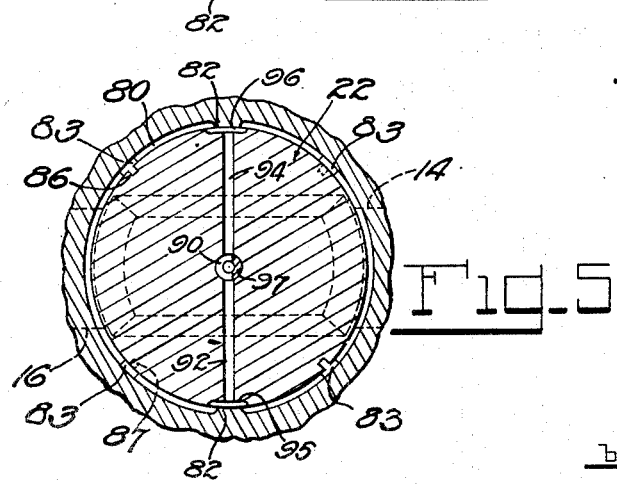

2,608,374

UNITED STATES PATENT OFFICE 2,608,374

VALVE

French H. Morehead, Whittier, Calif., assignor, by mesne assignments, to Walworth Company, New York, N. Y., a corporation of Massachusetts Application October 31, 1947, Serial No. 783,395

9 Claims. (Cl. 251—93)

This invention relates to lubricated plug valves and, more particularly, to the lubrication system thereof.

In plug valves of the so-called selective lubrication type it is practicable to lubricate the low pressure side of the valve plug in closed position while preventing lubricant from escaping from the high pressure side. However, in the event that the direction of pressure of the line fluid is changed, it becomes necessary to reverse the direction of lubricant flow accordingly. On valves of large size, such as are used in natural gas transmission lines, it is impracticable to reverse the lubricant flow by rotating the plug member 180 degrees in its seat as is done on small size valves where such expedient is satisfactory. The difficulty arises due to the impossibility of rotating the plug member at all when the valve is closed with the line pressure on the side to which the lubricant is directed. Further difficulty presents itself because many large valves are provided with operating devices of various sorts. In some cases the operating device would need to be dismantled entirely in order to rotate the plug member 180 degrees. The problem of opening a valve in such cases can only be satisfactorily solved by forcing lubricant to the low pressure side before attempting to rotate the plug valve member in its seat.

An object of this invention is to reverse the lubricant supply from one side to the other of the valve member without requiring prior rotation of the valve member in its seat.

Another object of the invention is to lubricate the low pressure side of the valve member in the closed position while providing for distribution of lubricant to both the high and low pressure sides in the open position.

Another object of the invention is to distribute the lubricant equally on opposite sides of the valve member in the open position to obtain substantially balanced lubricant pressure.

Another object is to combine the improved selective lubrication arrangement with a lubricant distributing system which completely seals the ports and passageways of the valve in both open and closed positions.

Another object of the invention is to prevent accidental or undesired separation of the parts of the lubricant system from the valve by simple interlocking means.

Another object of the invention is to provide visual indication of the direction of lubricant distribution relative to the high pressure and low pressure sides.

Other objects and advantages will become apparent from the following description taken in connection with the accompanying drawings, wherein:

Fig. 1 is a vertical section of a valve embodying the present invention;

Fig. 2 is a plan view, partly in section, on the line 2—2 of Fig. 1;

Fig. 2a is a partial cross section on the line 2a—2a of Fig. 1;

Figs. 3 and 4 are sections taken respectively on the lines 3—3 and 4—4 of Fig. 1;

Fig. 5 is a view similar to Fig. 4 but with the parts differently positioned; and Fig. 6 is a development of the valve plug member superimposed on the valve body.

Referring more particularly to the drawings, the valve comprises a body member 10 having a tapered valve seat 12 provided with fluid passageways 14 and 16 extending transversely thereof. A tapered valve member 22 is seated in the valve seat 12 and has a port 24 therethrough adapted to register with the passageways 14 and 16 when the valve is in open position. A flanged retaining member 18 is provided at the larger end of the valve seat 12 partly overlying the valve member 22 and is secured to the body 10 by means of the bolts 20. A stem 26 extends from the larger end of the valve member 22 and defines a shoulder 27 thereon upon which the flanged end 28 of a stem extension member 30 is secured by bolts 31. The opposite end of the stem extension member 30 supports a tubular support member 32 provided with an external annular shoulder 34 for a purpose apparent hereinafter.

The valve member 22 is retained in its seat by the thrust exerted by a flanged adjusting member 36 which engages a second shoulder 38 formed on the support member 32 beyond the shoulder 34 thereon. It will be apparent that anti-friction bearings could be provided between the member 36 and the shoulder 38 if desired. The adjusting member 36 is secured by bolts 40 to a cross-arm 42 which is carried on a support 44 and extends on either side of the adjusting member 36. The support 44 is secured by the bolts 46 to a flanged head 48 which is carried on one end of a stand pipe 50 secured at the opposite end to the retainer member 18.

While the particular mode of operation of the valve member is not essential to this invention it is shown as comprising combined power and manual actuating means. Thus, the shoulder 34 of the support member 32 serves as a seat for a driven element 52 which is keyed or otherwise suitably secured to the support member 32 against relative rotation. The driven element 52 has a driving element 54 journaled thereon carrying a gear segment 56 formed on the outer periphery thereof. The driving connection between the elements 54 and 52 is provided by an arcuate slot 58 formed in the element 52 and which is engaged at one end wall thereof by an operating pin 60 carried by the element 54. Located at the opposite end of the slot 58 but in the element 54 is an aperture 62 for the reception of a detachable pin (not shown) which may be inserted therein when desired. Thus, pin 60 serves as a driving means for closing the valve, while the detachable pin is inserted should the valve require opening.

The gear segment 56 is engaged by a hollow gear rack 64 which is movable transversely across the valve and parallel with the passageways 14, 16 by a pressure cylinder 66 having a piston 68 connected to one end of the gear rack 64. The gear rack 64 is housed within a trough-shaped extension 70 of the support 44 which also provides a bearing for one end of a threaded stem 72 carrying a handwheel 74 for manual operation. The opposite end of the threaded stem 72 projects within the hollow gear rack 64 and is supported therein by a tubular member 76 which slidably engages the inner wall thereof. The gear rack 64 and the tubular member 76 may be connected together against relative axial movement by a slidable pin 78 which projects through the wall of the rack 64 and can engage an aperture 79 in the tubular member 76. Such connection is made prior to emergency manual operation of the valve and the pin 78 is normally retracted from the aperture 79 to permit relative slidable movement of the gear rack 64 and the tubular member 76 during power actuation. The rotation of the valve member 22 is limited to about ninety degrees by the engagement of the piston 68 with the end walls of the cylinder 66.

The valve seat 12 formed in the body 10 is provided with a pair of diametrically opposite transverse lubricant grooves 80 each of which is located above one of the fluid passageways 14 and 16 respectively. As shown in Fig. 6, the grooves together substantially surround the valve seat 12 but have blind ends providing a pair of diametrically opposite land portions 82. The seating surface 12 is further provided with a pair of diametrically opposite transverse grooves 84 each located below one of the fluid passageways 14 and 16 and having blind ends similar to the lubricant grooves 80 which are positioned thereabove. Furthermore, the valve seat 12 is provided with eight dwarf grooves 83 which are located one on each side of the passageways 14 and 16 both above and below these passageways and which project from each of the pairs of transverse grooves 80 and 84.

The seating surface of the plug member 22 is provided with two longitudinal grooves 86 and 87 which are located one on each side of the passageway 14 when the valve member 22 is in either full-closed or full-open position. These grooves 86 and 87 are duplicated at the opposite side of the valve, that is, on each side of passageway 16 and similar reference numerals are applied thereto. As will later be apparent, the valve member 22 is limited to substantially ninety degrees rotation in its seat 12 so that two diametrically opposite longitudinal grooves 86 are never exposed to the line fluid in the passageways 14 and 16. Consequently, these two longitudinal grooves 86 may extend into communication with the transverse grooves 80 and 84 in the body 10 while the other two diametrically opposite lubricant grooves 87 terminate short of such connection but are adapted to overlie the ends of the dwarf grooves. When the valve member 22 is rotated in the valve seat 12 from the full-open or closed position the longitudinal grooves 87 which terminate short of connection with the transverse grooves 80 and 84 are immediately disconnected from communication therewith and are thus cut-off from the source of lubricant supply.

Lubricant is supplied to the grooves from a reservoir 90 which extends axially of the valve stem 26 and communicates at one end with a pair of lubricant ducts 92 and 94 which extend in opposite directions therefrom transversely of the valve member 22 for communication with the grooves 80 in the full-closed position of the valve. At the outer end of each duct 92, 94 is a pocket 95, 96 respectively which is of sufficient length to bridge the opposite ends of the transverse grooves 80 across the lands 82. The reservoir 90 has a threaded wall for engagement with the externally threaded end of a tubular connector 91 which is freely rotatable therein. The end of the connector 91 beyond the threaded portion is of reduced diameter and extends into the plane of the ducts 92 and 94. This end is cut-away to form a segmental projection 97 thereon which is effective to close off the end of either one of the ducts 92 or 94 from the reservoir 90 when the valve member 22 is in closed position. Moreover, the segmental projection 97 is so formed that when the valve member 22 is rotated to open position then the projection 97 is wholly located to one side of the ducts 92 and 94 and is incapable of closing off any of the opposite ends of the ducts as is clearly apparent from Fig. 5.

The connector 91 may be provided with a check valve 98 to prevent reflux of lubricant from the reservoir 90. Coupled to the end of the connector 91 is an extension pipe 100 which extends axially through the support member 32 and has its terminal end in threaded engagement with an internally threaded adapter member 102 which projects beyond the adjusting member 36. A lubricant compressor screw 104 is operative in the adapter 102 for compressing the lubricant in the system for distribution to the various ducts and grooves described.

The lubricant pipe assembly comprising the parts 102, 100 and 91 is prevented from rotating with the valve member 22 by the provision of limit stop means which also serves the purpose of locating the segmental projection 97 relative to the ducts 92 and 94 as desired. This limit stop means comprises a stop collar 106 having a square or other non-circular aperture 108 formed therein for engagement with a complemental non-circular portion 110 formed on the adapter 102. In this embodiment, the aperture 108 and portion 110 have square conformation but are so formed that the stop member 106 can be placed on the adapter member 102 in only one position. To this end, one corner 112 of the otherwise square conformation is flattened to accomplish this purpose.

Interengaging means on the stop collar 106 and a stationary part of the valve serves to maintain the lubricant pipe assembly stationary during rotation of the valve member. In this embodiment, two oppositely disposed projections or lugs 114 on one face of the stop collar 106 fit between a pair of lugs 116 formed diametrically opposite each other on the adjacent face of the adjusting member 36. Suitable means for locating the position of the segmental projection 97 may take the form of an arrow indicia 118 formed at the appropriate location on the stop collar 106 and pointing toward the indicia "Low Pressure When Closed" as shown in Fig. 2a. It will be understood that the arrow 118 is appropriately located with respect to the flattened corner 112 of the stop when the part is formed. Undesired tampering with the lubricant system and protection against the entrance of dirt or moisture therein is afforded by the provision of a cap nut 120 which extends over the lubricant compressor screw 104 and threadedly engages with the flanged end of the adjustment member 36. As will be apparent, suitable locking means could be employed if desired to prevent unauthorized removal of the cap nut 120.

Suitable stop means have been provided in order that the lubricant pipe assembly cannot be removed entirely from the valve stem 26 by unscrewing the connector 91 therefrom. This means takes the form of a pronged collar 122 which is secured to the connector 91, as by the screws 124, and has operative engagement with a projection 126 carried by the valve stem 26. The arrangement is such that the lubricant pipe assembly can be rotated relative to the valve member 22 approximately 270 degrees and renders it impossible for the parts to be separated as long as the stop collar 122 is in position. The hazard encountered by removal of the lubricant pipe assembly under line pressure is thus avoided. It will be apparent that the same object could be achieved by restricting the axial motion of the stop collar 106 on the adapter 102 to a position required only to free the lugs 114 from the lugs 116 and by providing for limited rotation of the lubricant pipe assembly in this position by a stop arrangement cooperable between the collar 106 and the member 36. In such event, the collar 122 and associated parts could be dispensed with.

The various parts of the lubricant system can be assembled in the position shown in Fig. 1 of the drawings so that lubricant will be distributed through the duct 92 only while the duct 94 is closed off by the segmental projection 97 as shown in Fig. 4. The segmental projection 97 is located relative to the duct 94 by the lugs 114 which fit between the pair of lugs 116, it being apparent that the flattened portion 112 of the non-circular aperture 108 is positioned on the same side of the valve member 22 as the segmental projection 97. Lubricant is thus distributed to the frame of grooves around the passageway 16 only and will free the valve member for rotation to open position against line fluid pressure in passageway 14.

When the valve is operated to open position as shown in Fig. 5, either by the pressure cylinder 66 or the handwheel 74 described, then the ducts 92 and 94 will be positioned opposite the lands 82 and the segmental projection 97 will lie wholly to one side of the ducts to prevent closing of either of the opposite ends thereof. As the pockets 95 and 96 serve to bridge the opposite end of the transverse grooves 80 in this full-open position the lubricant is distributed to all of the recesses at this time. Moreover, not only is the valve automatically lubricated on all sides in the full-open position but the lubrication is substantially balanced as will be apparent.

The valve member 22 may be in closed position when the direction of pressure of the line fluid is changed so that the seating surface adjacent the passageway 16 becomes the high pressure end. The lubrication of the low pressure end adjacent the passageway 14 can readily be effected in this event. The stop collar 106 is lifted from engagement with the adapter 102 and a wrench or other tool applied to the adapter to rotate the entire lubricant pipe assembly about 180 degrees from the position shown in the drawings. As described, this rotation relative to the valve member 22 is made practicable by the threaded end of the connector 91 rotating in the threaded wall of the reservoir 90. The stop collar 106 is then replaced and, due to the flattened portion 112 of the non-circular aperture 108 engaging the complemental flattened portion of the adapter 102, there can be no error in replacing this stop collar 106 with the arrow 118 pointing diametrically opposite to the position shown in Fig. 2a. Thus, the lugs 114 will now engage between the opposite lugs 116 on the adjusting member 36 to those previously engaged to prevent the lubricant pipe assembly from thereafter rotating with the valve member 22. As the segmental projection 97 is now located in position to close off the duct 92, then the frame of lubricant grooves adjacent the passageway 14 will receive lubricant in the closed position of the valve. It is apparent that in the open valve position, the same conditions as described in connection with the illustrated position will occur and all the grooves will receive lubricant.

Various modifications in the arrangement and combination of parts and in the details of construction are within the scope of this invention as defined in the appended claims.

I claim:

1. A lubricated plug valve comprising a body member having a valve seat provided with passageways for line fluid, a valve member engaging said seat and provided with a port adapted to register with said passageways when the valve member is in open position, means for distributing lubricant to the seating surfaces of said members both adjacent to and intermediate said body passageways, means for confining said lubricant distribution to the seating surface portions adjacent selected body passageways when the valve member is in closed position, said last means including an adjustable cut-off member cooperable with said distributing means for causing said selective distribution to any adjacent portion in said closed position, and an operative connection between said cut-off member and said body member for preventing movement of said cut-off member upon movement of said valve member from said closed position to thereby vary the relation between said cut-off member and said distributing means and cause substantially equal distribution to said intermediate portions in said open position.

2. A lubricated plug valve comprising a body member having a valve seat provided with passageways for line fluid, a valve member engaging said seat and provided with a port adapted to register with said passageways when the valve member is in open position, lubricant ducts in at least one of said members for distributing lubricant to the seating surfaces of said members both adjacent to and intermediate said body passageways, and means for confining said lubricant distribution to the seating surface portions adjacent selected body passageways when the valve member is in closed position, said means including an adjustable cut-off member for closing off certain of said ducts and causing selective distribution to any adjacent portion in said closed position, and an operative connection between said cut-off member and said body member for preventing movement of said cut-off member upon movement of said valve member from said closed position to thereby vary the relation between said cut-off member and said ducts and causing substantially equal distribution through all of said ducts to said intermediate portions in said open position.

3. A lubricated plug valve comprising a body member having a valve seat provided with passageways for line fluid, a valve member engaging said seat and provided with a port adapted to register with said passageways when the valve member is in open position, lubricant distributing recesses in one of said members extending adjacent said body passageways and being disconnected from each other, lubricant ducts in the other said member adapted for communication with said recesses when the valve member is in closed position, an adjustable cut-off member effective between said ducts and at least one of said recesses in said closed position for causing distribution of lubricant selectively to said recesses, and an operative connection between said cut-off member and said body member for preventing movement of said cut-off member upon movement of said valve member from said closed position and causing distribution to all of said recesses in said open position to thereby vary the relation between said cut-off member and said ducts and recesses.

4. In a lubricated plug valve, a body member having passageways for line fluid, a valve member rotatable in said body and having a port adapted to be moved into and out of registry with said passageways in different positions of said valve member establishing the full-open and full-closed positions of said valve, lubricant distributing recesses in one of said members extending adjacent said body passageways, land portions intermediate said passageways and separating said recesses, lubricant ducts in the other said member adapted for communication with said recesses in said full-closed position and with said land portion in said full-open position, adjustable cut-off means effective between said ducts and at least one of said recesses in said full-closed position for causing distribution of lubricant selectively to said recesses, an operative connection between said cut-off member and said body member for preventing movement of said cut-off member upon movement of said valve member to full-open position to render said cut-off member ineffective between said ducts and passage means associated with said ducts and bridging said recesses across said land portions in said full-open position for causing distribution of lubricant to all of said recesses.

5. In a lubricated plug valve, a body member having passageways for line fluid, a valve member rotatable in said body and having a port adapted to be moved into and out of registry with said passageways in different positions of said valve member establishing the full-open and full-closed positions of said valve, lubricant distributing recesses in one of said members extending adjacent said body passageways, land portions intermediate said passageways and separating said recesses, lubricant ducts in the other said member adapted for communication with said recesses in said full-closed position and with said land portions in said full-open position, means for confining said lubricant distribution to the recesses adjacent selected body passageways when the valve member is in full-closed position, said means including an adjustable cut-off member for closing off the duct communicating with certain of said recesses in said full-closed position, an operative connection between said cut-off member and said body member for preventing said cut-off member upon movement of said valve member from said closed position and opening all of said ducts, and passage means associated with said ducts and bridging said recesses across said land portions in said full-open position for causing distribution of lubricant to all of said recesses.

6. In a lubricated plug valve, a body member having passageways for line fluid, a valve member rotatable in said body and having a port adapted to be moved into and out of registry with said passageways in different positions of said valve member establishing the full-open and full-closed positions of said valve, lubricant distributing recesses in one of said members extending adjacent said body passageways and being disconnected from each other, oppositely disposed lubricant ducts in the other said member adapted for communication with said recesses in said full-closed position, means for confining said lubricant distribution to the recesses adjacent selected body passageways when the valve member is in full-closed position, said means including a lubricant reservoir having a wall movable relatively to said valve member and having an extension of said wall projecting between opposite ends of said ducts, said extension being adapted for closing off the duct communicating with certain of said recesses in said full-closed position but being located by movement of said valve member from closed position intermediate said ducts to prevent closing-off any of said ducts, and means operative between said wall of the reservoir and said body member for preventing rotation of said reservoir with said valve member.

7. In a lubricated plug valve, a body member having passageways for line fluid, a valve member rotatable in said body and having a port adapted to be moved into and out of registry with said passageways in different positions of said valve member establishing the full-open and full-closed positions of said valve, lubricant distributing recesses in said body member extending adjacent said fluid passageways and being disconnected from each other, lubricant ducts extending in opposite directions transversely of said valve member for communication with said recesses in said full-closed position, a hollow stem for said valve member providing a lubricant reservoir having a terminal portion extending between opposite ends of said ducts in communication therewith, a tubular member supported in said reservoir for rotation relative to said valve member, a segmental projection on said tubular member located within said terminal portion for closing off the end of one of said ducts from said reservoir when the valve member is in closed position, said projection being located to one side of said ducts when the valve member is in open position to prevent closing-off any of said opposite ends of said ducts, and stop means operative between said tubular member and said body member for locating said projection relative to said ducts and for preventing rotation of said tubular member with said valve member.

8. In a lubricated plug valve, a body member having passageways for line fluid, a valve member rotatable in said body and having a port adapted to be moved into and out of registry with said passageways in different positions of said valve member establishing the full-open and full-closed positions of said valve, lubricant distributing recesses in said body member extending adjacent said fluid passageways and being disconnected from each other, lubricant ducts extending in opposite directions transversely of said valve member for communication with said recesses in said full-closed position, a hollow stem for said valve member providing a lubricant reservoir having a terminal portion extending between opposite ends of said ducts in communication therewith, a tubular member supported in said reservoir for rotation relative to said valve member, a segmental projection on said tubular member located within said terminal portion for closing off the end of one of said ducts from said reservoir when the valve member is in closed position, said projection being located to one side of said ducts when the valve member is in open position to prevent closing-off any of said opposite ends of said ducts, and means for locating said projection relative to said ducts and for holding said tubular member against rotation with said valve member, said means comprising a stop collar having means interengaging with said tubular member for preventing relative rotation therebetween, and interengaging means on said collar and said body for preventing relative rotation therebetween.

9. A lubricated plug valve comprising a body member having a valve seat provided with passageways for line fluid, a valve member engaging said seat and having a port for registry with said passageways in the open position of said valve, lubricant distributing recesses in said body member extending adjacent said passageways and disconnected from each other, lubricant ducts extending in opposite directions transversely of said valve member for communication with said recesses in the closed valve position, a hollow stem for said valve member providing a lubricant reservoir having a terminal portion extending between opposite ends of said ducts in communication therewith, a tubular member in said reservoir having threaded engagement with said stem for rotation relative to said valve member, a segmental projection on said tubular member located within said terminal portion for closing off the end of one of said ducts from said reservoir when the valve is in closed position, said projection being located to one side of said ducts when the valve is in open position to prevent closing-off any of said opposite ends of said ducts, means operative between said tubular member and said stem for limiting relative rotation therebetween, a stop collar having a non-circular aperture therein engaging a complemental non-circular portion on said tubular member for preventing relative rotation therebetween, and interengaging projections on said collar and body member for preventing relative rotation therebetween.

FRENCH H. MOREHEAD.

REFERENCES CITED

The following references are of record in the file of this patent:

UNITED STATES PATENTS

| Number | Name | Date |
|---|---|---|
| 2,093,091 | McCarthy | Sept. 14, 1937 |
| 2,107,182 | Henderson | Feb. 1, 1938 |
| 2,119,766 | Aderhold | June 7, 1938 |
| 2,254,341 | Zaikowsky | Sept. 2, 1941 |
| 2,265,526 | Henderson | Dec. 9, 1941 |
| 2,322,379 | Morehead | June 22, 1943 |